(12) United States Patent
Araki

(10) Patent No.: US 9,116,855 B2
(45) Date of Patent: Aug. 25, 2015

(54) DATA PROCESSING SYSTEM AND DATA PROCESSING METHOD

(75) Inventor: Takuya Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 264 days.

(21) Appl. No.: 13/704,178

(22) PCT Filed: Jun. 10, 2011

(86) PCT No.: PCT/JP2011/003314
§ 371 (c)(1),
(2), (4) Date: Dec. 13, 2012

(87) PCT Pub. No.: WO2011/158478
PCT Pub. Date: Dec. 22, 2011

(65) Prior Publication Data
US 2013/0091203 A1   Apr. 11, 2013

(30) Foreign Application Priority Data

Jun. 17, 2010   (JP) .................................. 2010-138398

(51) Int. Cl.
*G06F 15/16* (2006.01)
*G06F 9/54* (2006.01)
(52) U.S. Cl.
CPC ................ *G06F 15/16* (2013.01); *G06F 9/547* (2013.01)
(58) Field of Classification Search
None
See application file for complete search history.

(56) References Cited

U.S. PATENT DOCUMENTS

| 6,157,960 A * | 12/2000 | Kaminsky et al. ............ 719/315 |
| 2004/0083483 A1 | 4/2004 | Yamamoto et al. |
| 2005/0155044 A1 * | 7/2005 | Broussard et al. ............ 719/330 |

FOREIGN PATENT DOCUMENTS

| JP | 11-085519 A | 3/1999 |
| JP | 11-338704 A | 12/1999 |
| JP | 2001-337935 A | 12/2001 |
| JP | 2004-151800 A | 5/2004 |

OTHER PUBLICATIONS

Stevens, W., Richard, "UNIX Network Programming," Prentice Hall, Inc., 1st Edition, Jul. 30, 1992, pp. 809-829.

* cited by examiner

*Primary Examiner* — Scott B Christensen
(74) *Attorney, Agent, or Firm* — Sughrue Mion, PLLC

(57) ABSTRACT

A client (300) acquires a user function symbol name, acquires a pointer to a wrapper function, which is defined as a template function and internally executes the user function by designating the types of argument and return value of the user function as a template argument, and acquires a wrapper function symbol name of the wrapper function using the pointer to the wrapper function. A server (310) acquires, from the client, the user function symbol name, data corresponding to the arguments of the user function, the wrapper function symbol name, and a shared library user program in which the user program and the wrapper function are compiled as a shared library. The server executes the wrapper function within the shared library user program, which is specified by the pointer to the wrapper function, using the user function symbol name and the data corresponding to the arguments of the user function as arguments.

9 Claims, 14 Drawing Sheets

FIG. 6

```
int userfunc1(int x){return x * 2;}    // THESE ARE CALLED BY SERVER
int userfunc2(int x){return x * x;}    // NUMBER AND TYPE OF ARGUMENTS AND TYPE OF RETURN
                                       //    VALUE ARE FIXED
main(){
  Node server = ...                    // INFORMATION ON SERVER IS ACQUIRED
  init(server, "userprogram.so");      // "userprogram.so" IS SHARED LIBRARY USER PROGRAM
  int r1 = rpc(server, userfunc1, 1);  // r1 = 2
  int r2 = rpc(server, userfunc2, 2);  // r2 = 4
}
```

FIG. 7

```
init(Node server, char* filename){
  int s = connect_to_server(server);            // CONNECT TO SERVER
  int bufsize = read_from_file(buf, filename);  // READ SHARED LIBRARY USER PROGRAM
  write_to_socket(s, buf, bufsize);             // SEND SHARED LIBRARY USER PROGRAM TO SERVER
  close_connection(s);
} char* get_symbol(void* f){
  Dl_info info;
  dladdr(f, &info)
  return info.dli_sname;
} int rpc(Node server, int(*f)(int), int arg){
  char* symbol = get_symbol((viod*)f);            // ACQUIRE USER FUNCTION SYMBOL NAME
  int s = connect_to_server(server);              // CONNECT TO SERVER
  write_to_socket(s,symbol,strlen(symbol));       // SEND USER FUNCTION SYMBOL NAME TO SERVER
  write_to_socket(s,(char*)&arg,sizeof(int));     // SEND ARGUMENT TO SERVER
  read_from_socket(s,buf);                        // RECEIVE RETURN VALUE FROM SERVER
  int ret = *((int*)buf);
  close_connection(s);
  return ret;
}
```

FIG. 8

```
main(){
  int s = accept_connection();                    // ACCEPT CONNECTION FROM CLIENT
  Int bufsize = read_from_socket(s,buf);          // RECEIVE SHARED LIBRARY USER PROGRAM
  write_to_file("/tmp/tmpfile.so", buf, bufsize); // WRITE SHARED LIBRARY USER PROGRAM TO FILE
  void* handle = dlopen("/tmp/tmpfile.so",RTLD_LAZY);
  close_connection(s);

while(1){
    s = accept_connection();                      // ACCEPT CONNECTION FROM CLIENT
    read_from_socket(s,symbol);                   // RECEIVE USER FUNCTION SYMBOL NAME
    read_from_socket(s,buf);                      // RECEIVE ARGUMENT
    int arg = *(int*)buf;
    // "functype" IS TYPE OF POINTER TO FUNCTION THAT TAKES "int" AS ARGUMENT AND RETURNS "int"
    typedef int(*functype)(int);
    functype f = (functype)dlsym(handle,symbol);
    int ret = f(arg);                             // EXECUTE FUNCTION
    write_to_socket(s,(char*)&ret,sizeof(int));   // SEND RETURN VALUE
    close_socket(s);
  }
}
```

FIG. 9

```
int userfunc1(int x){return x * 2;}                // THESE ARE CALLED BY SERVER
double userfunc2(double x, double y){return x * y;}  // NUMBER AND TYPE OF ARGUMENT AND TYPE OF
                                                      RETURN VALUE ARE OPTIONAL
main(){
  Node server = ...
  init(server, "userprogram.so");
  int r1 = rpc(server, userfunc1, 1);  // r1 = 2 (SINCE THIS CAN BE INFERRED BY COMPILER, IT IS NOT
                                              NECESSARY TO DESIGNATE AS "rpc<int, int>" OR LIKE)
  double r2 = rpc(server, userfunc2, 2.0, 3.0 );  // r2 = 6.0
}
```

FIG. 10

```
template <class R, class T1>
void wrapper(char* symbol, void* handle, binary_iarchive input, binary_oarchive* output){
  typedef R(*functype)(T1);
  functype f = (functype)dlsym(symbol, handle);
  T1 a1; R ret;
  input >> a1;    // DESERIALIZE ARGUMENT
  ret = f(a1);
  *output << ret;  // SERIALIZE RETURN VALUE
}
```

FIG. 11

```
template <class R, class T1>
R rpc(Node server,R(*f)(T1),T1 a1){
    void(*wrapper_ptr)(char*,void*,binary_iarchive,binary_oarchive*) = wrapper<R,T1>;// ACQUIRE WRAPPER
                                                                                      FUNCTION POINTER
    char* wrapper_symbol = get_symbol((void*)wrapper_ptr);   // ACQUIRE WRAPPER FUNCTION SYMBOL NAME
    char* symbol = get_symbol((void*)f);                     // ACQUIRE USER FUNCTION SYMBOL NAME
    ostringstream os;
    binary_oarchive input(os);
    input << a1;                                             // SERIALIZE ARGUMENT
    int s = connect_to_server(server);                       // CONNECT TO SERVER
    write_to_socket(s,symbol,strlen(symbol));                // SEND USER FUNCTION SYMBOL NAME
    write_to_socket(s,os.str().c_str(),os.str().length());   // SEND SERIALIZED ARGUMENT
    write_to_socket(s,wrapper_symbol,strlen(wrapper_symbol));// SEND WRAPPER FUNCTION SYMBOL NAME
    read_from_socket(s,buf);                                 // RECEIVE SERIALIZED RETURN VALUE
    istringstream is(string(buf));
    binary_iarchive output(is);
    R ret;
    output >> ret;                                           // DESERIALIZE RETURN VALUE
    close_connection(s);
    return ret;
}
```

FIG. 12

```
template <class R, class T1, class T2>   // NUMBER OF TEMPLATE ARGUMENT IS THREE
void wrapper(char* symbol, void* handle, binary_oarchive input, binary_oarchive* output){
    typedef R(*functype)(T1, T2);        // NUMBER OF ARGUMENTS IS DIFFERENT
    functype f = (functype)dlsym(symbol, handle);
    T1 a1, T2 a2, R ret;
    input >> a1;  input >> a2;           // DESERIALIZE TWO ARGUMENTS
    ret = f(a1, a2);                     // EXECUTE FUNCTIONS OF TWO ARGUMENTS
    *output << ret;
}
```

FIG. 13

```
template <class R, class T1, class T2>        // NUMBER OF TEMPLATE ARGUMENTS IS THREE
R rpc(Node server,R(*f)(T1, T2), T1 a1, T2 a2){  // NUMBER OF ARGUMENTS OF FUNCTION IS TWO
  void(*wrapper_ptr)(char*,void*,binary_iarchive,binary_oarchive*) = wrapper<R,T1,T2>;// NUMBER OF TEMPLATE
                                                                                       ARGUMENTS IS THREE
  char* wrapper_symbol = get_symbol((void*)wrapper_ptr);
  char* symbol = get_symbol((void*)f);
  ostringstream os;
  binary_oarchive input(os);
  input << a1 << a2;                          // SERIALIZE TWO ARGUMENTS
  int s = connect_to_server(server);
  write_to_socket(s,symbol,strlen(symbol));
  write_to_socket(s,os.str().c_str(),os.str().length());       ));
  write_to_socket(s,wrapper_symbol,strlen(wrapper_symbol)
  read_from_socket(s,buf);
  istringstream is(string(buf));
  binary_iarchive output(is);
  R ret;
  output >> ret;
  close_connection(s);
  return ret;
}
```

FIG. 14

```
main(){
  int s = accept_connection();
  int bufsize = read_from_socket(s,buf);
  write_to_file("/tmp/tmpfile.so", buf, bufsize);
  void* handle = dlopen("/tmp/tmpfile.so",RTLD_LAZY);
  close_connection(s);

while(1){
    s = accept_connection();                                              // ACCEPT CONNECTION FROM CLIENT
    read_from_socket(s, symbol);                                          // ACQUIRE USER FUNCTION SYMBOL NAME
    read_from_socket(s, buf);                                             // ACQUIRE SERIALIZED ARGUMENT
    istringstream is(string(buf));
    binary_iarchive input(is);
    read_from_socket(s,wrapper_symbol);                                   // OBTAIN SYMBOL NAME OF WRAPPER FUNCTION
    typedef void(*wrappertype)(char*,void*,binary_iarchive, binary_oarchive*);
    wrappertype wrapper = (wrappertype)dlsym(wrapper_symbol, handle);     // ACQUIRE WRAPPER FUNCTION POINTER
    ostringstream os;
    binary_oarchive output(os);
    wrapper(symbol,handle,input, &output);                                // EXECUTE WRAPPER FUNCTION
    write_to_socket(s,os.str().c_str(), os.str().length());               // RETURN EXECUTION RESULT TO CLIENT
    close_connection(s);
  }
}
```

DATA PROCESSING SYSTEM AND DATA PROCESSING METHOD

CROSS REFERENCE TO RELATED APPLICATIONS

This application is a National Stage of International Application No. PCT/JP2011/003314, filed on Jun. 10, 2011, which claims priority from Japanese Patent Application No. 2010-138398, filed on Jun. 17, 2010, the contents of all of which are incorporated herein by reference in their entirety.

TECHNICAL FIELD

The present invention relates to a data processing technique of executing parallel distributed processing by connecting a plurality of computing devices through a network.

BACKGROUND ART

In recent years, parallel distributed processing is performed in which a plurality of servers, which are connected through a network, performs programs in parallel.

When such parallel distributed processing is performed, since it is complicated for a programmer to directly describe communication processes, a Remote Procedure Call (RPC) is often used. The RPC implements a way of calling a procedure on a separate server connected through a network in the same manner of writing as a general procedure call.

Due to this, the programmer uses descriptions similarly to procedure calls rather than directly describing complicated communication processes in order to perform a parallel distributed processing by making another server connected through a network perform a process, or data transfer.

An example of a RPC system is disclosed in Non-Patent Document 1 below. In this RPC system, a procedure interface that is called with a RPC is described in a certain special language.

This language is sometimes called an Interface Description Language (IDL). Here, the content described in the IDL includes the name of a called function, the number and the type of arguments, the type of a return value, and the like.

When the IDL is compiled by an IDL compiler, programs described in the C-language called client stub and server stub are generated. In a client stub and a server stub, processes such as communication for performing a procedure call on a separate server connected through a network are described. That is, a definition of a function described in an IDL is described as a server-side program, and the function is linked to a server stub.

Then, this program is executed in advance on the server side. A program that calls a function described in an IDL is described as a client-side program, and the function is linked to a client stub. When the client-side program is executed, the program is connected to a server side at a point in which the program calls a function described in an IDL, and the function is executed at the server side.

Another example of an RPC system of the related art is disclosed in Patent Document 1 below. This RPC system of the related art uses Java (registered trademark) languages and programs corresponding to a client stub and a server stub are automatically created by scanning compiled bytecodes. Due to this, a description of an IDL is not necessary.

Moreover, Patent Document 2 below discloses a technique related to an RPC of a client server, in which various libraries are stored in advance in library memory of the server, information on a function name argument is sent from the client to the server, and the server reads a library program corresponding to the information from the memory, executes the library program, and returns the execution result to the client.

RELATED DOCUMENT

Patent Document

Patent Document 1: Japanese Patent Application Publication NO. H11-085519
Patent Document 2: Japanese Patent Application Publication NO. H11-338704

Non-Patent Document

Non-Patent Document 1: W. Richard Stevens, "UNIX Network Programming" translated by Shinoda Youichi, 1st Edition, Jul. 30, 1992, pp. 809-829 (UNIX is a registered trademark)

SUMMARY OF THE INVENTION

In the system disclosed in Non-Patent Document 1, it is a burden for programmers to describe IDL in order to use RPC. The reason for this is because in the case of using IDL, the programmers need to learn IDL, which is a different language from a language used for describing a program.

Moreover, when the number and type of arguments of a function that is called with RPC, the type of the return value, and the like are changed, the programmers need to change the IDL and guarantee consistency between them. Further, when the programmers want to call a new function using the RPC, the IDL also needs to be changed.

In the system disclosed in Patent Document 1, although there is no burden to describe an IDL, the program language that can be used is limited to Java (registered trademark) or the like. The reason for this is because the system disclosed in Patent Document 1 is considered that it scans compiled bytecodes in order to obtain information on programs such as the number and type of arguments, the type of a return value, and the like.

The bytecodes output by a compiler of a language such as Java (registered trademark) are not converted up to native codes, and thus the processing speed thereof is generally slower than that of a language that is compiled to native codes such as C or C++, although the bytecodes contain a large amount of information. Thus, it is not possible to use the method disclosed in Patent Document 1 in a case that a higher speed language, such as C or C++ that compiles to native codes, is used.

Since the technique of Patent Document 2 assumes operations in an operating system (OS) level, it is necessary to change the OS in order to implement the technique. Further, since there is no specific and detailed description of a method of acquiring the "function name argument" on the client side and allowing the server to receive the argument and execute the function, a way of the implementation is not clear.

Moreover, the existing system needs to describe a client-side program and a server-side program as separate programs, which is a burden to programmers. The reason for this is because when a RPC is used in order to improve the speed through parallel distributed processing, it is less burdensome for programmers if a program that executes distributed execution processing can be described in a form that is close to a program that is executed on one machine (a program that does not use the RPC) than if it cannot be. In the existing system, a portion that is executed in a distributed manner needs to be separately treated as a server-side program, which is a burden to programmers.

The present invention has been made in view of the problems described above, and the present invention provides a data processing technique for allowing functions having various types of arguments and return values to be executed on another computer device according to an instruction from a certain computer device without increasing development burden.

Respective aspects of the present invention employ the following configurations in order to solve the above problems.

According to a first aspect of the present invention, there is provided a data processing system in which a client and a server communicate with each other, the client including: a user function symbol name acquiring unit that acquires a user function symbol name of an object pointed by a pointer to a user function included in a user program; a wrapper function pointer acquiring unit that acquires a pointer to a wrapper function that is defined as a template function and internally executes the user function by designating the types of argument and return value of the user function as a template argument; and a wrapper function symbol name acquiring unit that acquires a wrapper function symbol name of the wrapper function using the pointer to the wrapper function, and the server including: a communicating unit that acquires, from the client, the user function symbol name, data corresponding to the argument of the user function, the wrapper function symbol name, and a shared library user program in which the user program and the wrapper function are compiled as a shared library; a wrapper function pointer acquiring unit that acquires the pointer to the wrapper function using the wrapper function symbol name acquired by the communicating unit; and a wrapper function executing unit that executes the wrapper function, which is within the shared library user program and specified by the pointer to the wrapper function, using, as an argument, the user function symbol name and the data corresponding to the argument of the user function, which acquired by the communicating unit.

According to a second aspect of the present invention, there is provided a computer device including: a user function symbol name acquiring unit that acquires a user function symbol name of an object pointed by a pointer to a user function included in a user program; a wrapper function pointer acquiring unit that acquires a pointer to a wrapper function that is defined as a template function and internally executes the user function by designating the types of argument and return value of the user function as a template argument; a wrapper function symbol name acquiring unit that acquires a wrapper function symbol name of the wrapper function using the pointer to the wrapper function; and a communicating unit that sends, to another computer device, the user function symbol name, data corresponding to the argument of the user function, the wrapper function symbol name, and a shared library user program in which the user program and the wrapper function are compiled as a shared library.

According to a third aspect of the present invention, there is provided a computer device including: a communicating unit that acquires, from another computer device, a shared library user program in which a user program and a wrapper function that is defined as a template function and internally executes a user function included in the user program are compiled as a shared library, a user function symbol name, data corresponding to an argument of the user function, and a wrapper function symbol name; a wrapper function pointer acquiring unit that acquires the pointer to the wrapper function using the wrapper function symbol name acquired by the communicating unit; and a wrapper function executing unit that executes the wrapper function, which is within the shared library user program and specified by the pointer to the wrapper function, using, as an argument, the user function symbol name and the data corresponding to the argument of the user function acquired by the communicating unit.

According to a fourth aspect of the present invention, there is provided a program executed by a client and a server that communicate with each other, the program causing the following to be implemented in the client: a user function symbol name acquiring unit that acquires a user function symbol name of an object pointed by a pointer to a user function included in a user program; a wrapper function pointer acquiring unit that acquires a pointer to a wrapper function that is defined as a template function and internally executes the user function by designating the types of argument and return value of the user function as a template argument; and a wrapper function symbol name acquiring unit that acquires a wrapper function symbol name of the wrapper function using the pointer to the wrapper function, and the program causing the following to be implemented in the server: a communicating unit that acquires, from the client, the user function symbol name, data corresponding to the argument of the user function, the wrapper function symbol name, and a shared library user program in which the user program and the wrapper function are compiled as a shared library; a wrapper function pointer acquiring unit that acquires the pointer to the wrapper function using the wrapper function symbol name acquired by the communicating unit; and a wrapper function executing unit that executes the wrapper function, which is within the shared library user program and specified by the pointer to the wrapper function, using, as an argument, the user function symbol name and the data corresponding to the argument of the user function acquired by the communicating unit.

According to a fifth aspect of the present invention, there is provided a data processing method executed between a client and a server that communicate with each other, the method allowing the client to execute: acquiring a user function symbol name of an object pointed by a pointer to a user function included in a user program; acquiring a pointer to a wrapper function that is defined as a template function and internally executes the user function by designating the types of argument and return value of the user function as a template argument; and acquiring a wrapper function symbol name of the wrapper function using the pointer to the wrapper function, and the method allowing the server to execute: acquiring, from the client, the user function symbol name, data corresponding to the argument of the user function, the wrapper function symbol name, and a shared library user program in which the user program and the wrapper function are compiled as a shared library; acquiring the pointer to the wrapper function using the wrapper function symbol name; and executing the wrapper function, which is within the shared library user program and specified by the pointer to the wrapper function, using, as an argument, the user function symbol name and the data corresponding to the argument of the user function.

The respective components of the present invention may be formed so as to implement the functions. For example, the components can be implemented as dedicated hardware that performs a predetermined function, a data processing device in which a predetermined function is provided by a computer program, a predetermined function that is implemented in a data processing device by a computer program, and any combination of these functions.

Moreover, the respective components of the present invention may not be independent entities. A plurality of components may be formed as one member, one component may be formed as a plurality of members, a certain component may be a part of another component, and a part of a certain component may overlap with a part of another component.

Moreover, the computer program and the data processing method of the present invention describes a plurality of processes and operations in order. However, the order of executing the plurality of processes and the plurality of operations is not limited to the described order. Thus, when the computer program and the data processing method of the present invention are implemented, the order of the plurality of processes and the plurality of operations can be changed unless it causes a problem in terms of content.

Further, in the computer program and the data processing method of the present invention, the plurality of processes and the plurality of operations are not limited to being executed individually in different points in time. Thus, another process or operation may occur during execution of a certain process or operation, and the execution time of another process or operation may partially or wholly overlap with the execution time of a certain process or operation.

Moreover, the data processing device of the present invention can be implemented as hardware constructed with general-purpose devices such as a CPU (Central Processing Unit), ROM (Read Only Memory), RAM (Random Access Memory), and an I/F (Interface) unit so as to read a computer program to execute the corresponding processing operation, a dedicated logical circuit constructed to execute a predetermined processing operation, and combinations thereof.

According to the respective aspects described above, it is possible to provide a data processing technique for allowing functions having various types of arguments and return values to be executed on another computer device according to an instruction from a certain computer device without increasing development burden.

BRIEF DESCRIPTION OF THE DRAWINGS

FIG. 6 is a schematic view illustrating a user program according to a first example of the present invention.

FIG. 7 is a schematic view illustrating a client library according to the first example of the present invention.

FIG. 8 is a schematic view illustrating a server library according to the first example of the present invention.

FIG. 9 is a schematic view illustrating a user program according to a second example of the present invention.

FIG. 10 is a schematic view illustrating a wrapper function for a user function having one argument in a client library according to the second example of the present invention.

FIG. 11 is a schematic view illustrating an "rpc" function for a user function having one argument in the client library according to the second example of the present invention.

FIG. 12 is a schematic view illustrating a wrapper function for a user function having two arguments in the client library according to the second example of the present invention.

FIG. 13 is a schematic view illustrating an "rpc" function for a user function having two arguments in the client library according to the second example of the present invention.

FIG. 14 is a schematic view illustrating a server library according to the second example of the present invention.

DESCRIPTION OF EMBODIMENTS

Reference Example

Figure 1:
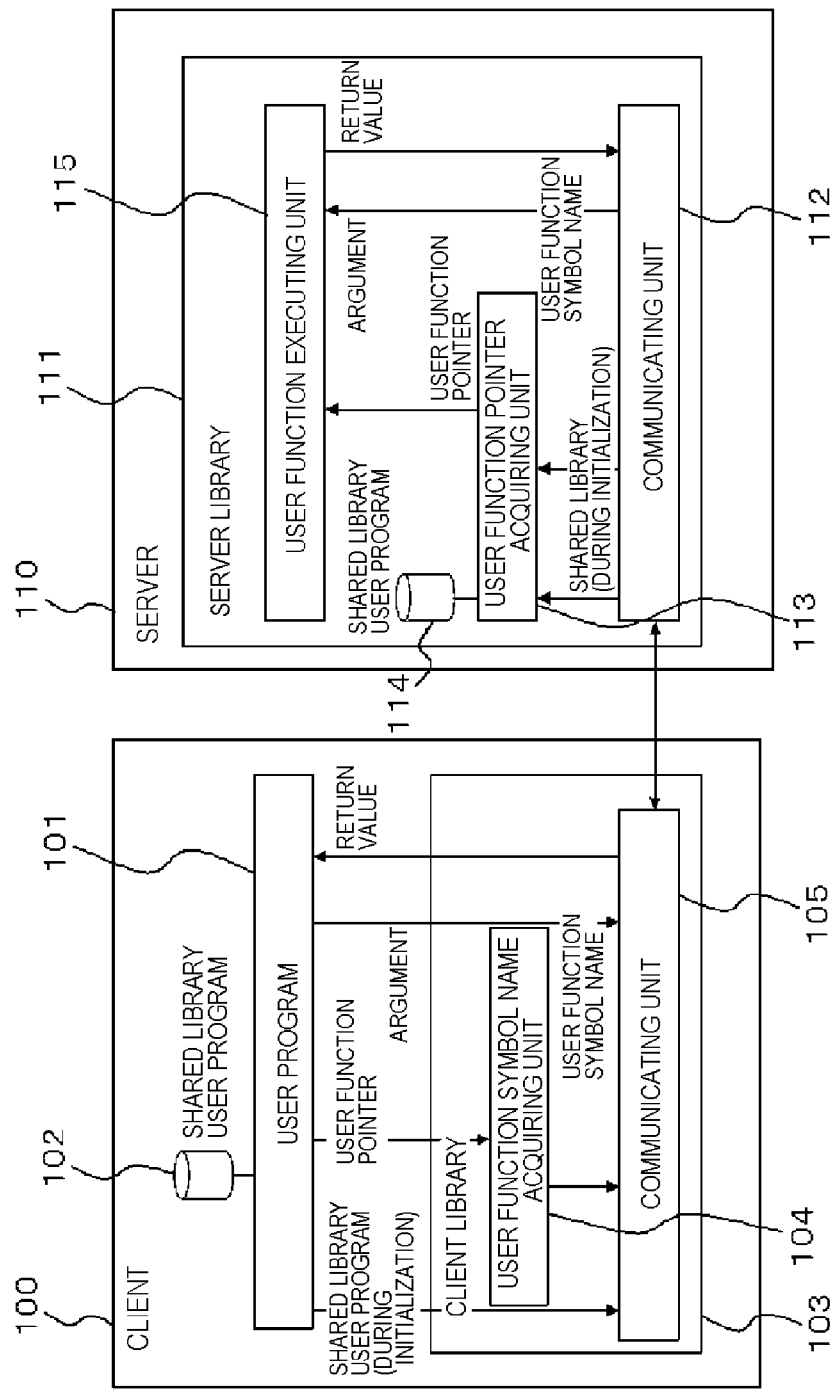
FIG. 1 is a block diagram illustrating a configuration according to a reference example of the present invention.
Figure 2:
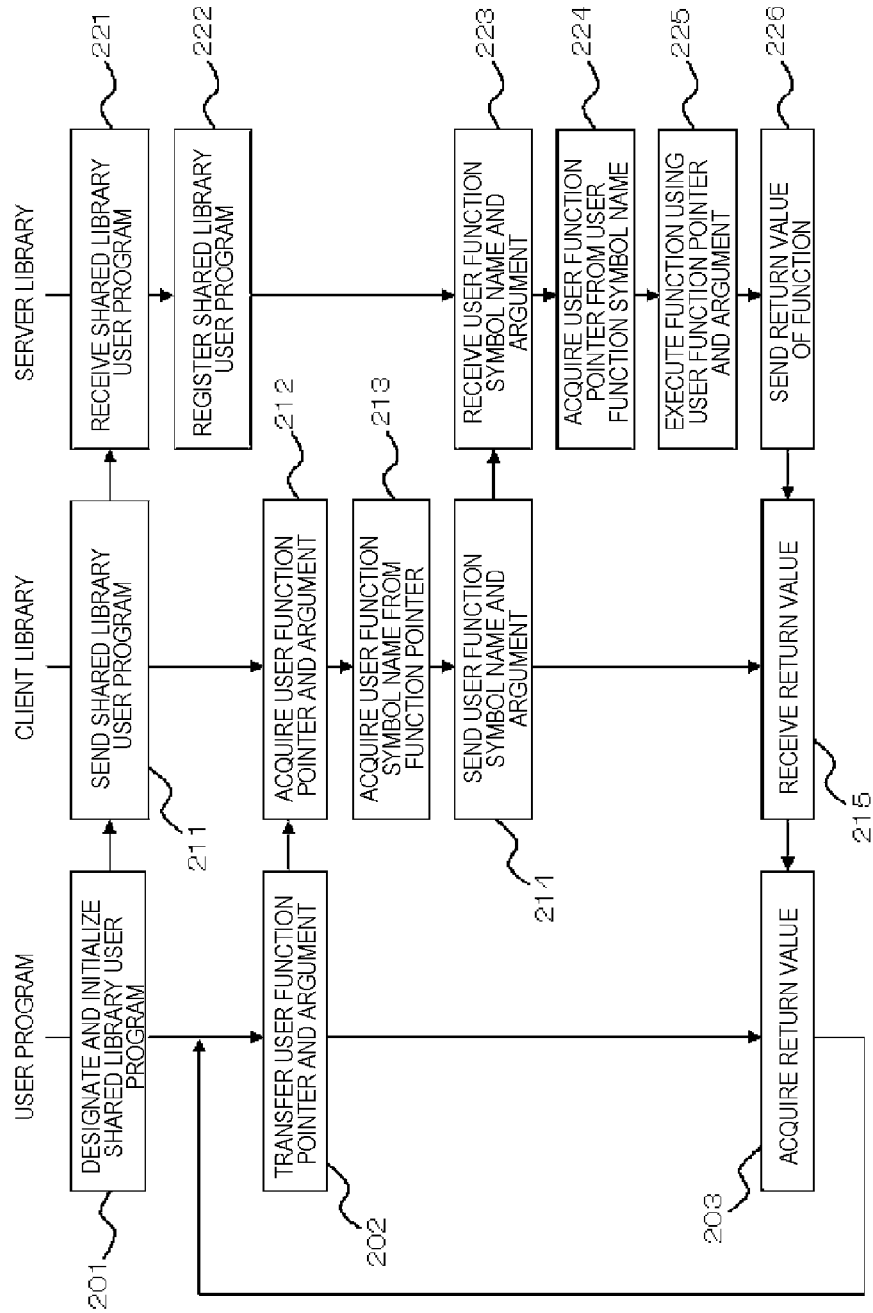
FIG. 2 is a flowchart illustrating an operation according to the reference example of the present invention.

First, a reference example of the present invention will be described with reference to FIGS. 1 and 2. As illustrated in FIG. 1, a data processing system according to the reference example of the present invention includes a client 100 and a server 110.

The client 100 includes a user program 101, a client library 103, and the like. The user program 101 includes a shared library user program 102. The client library 103 includes a user function symbol name acquiring unit 104 and a communicating unit 105.

The server 110 includes a server library 111. The server library 111 includes a communicating unit 112, a user function pointer acquiring unit 113, a user function executing unit 115, and the like. The server library 111 stores a shared library user program 114 acquired from the client 100 in a form such that the shared library user program 114 can be accessed from the user function pointer acquiring unit 113.

These units operate schematically in the following manner. The user describes the user program 101 and links the user program 101 and the client library 103. The same client library 103 and server library 111 are used regardless of the user program 101.

Moreover, when the user program 101 is compiled, the compiled user program 101 is also stored as a shared library. This is referred to as the shared library user program 102.

First, initialization is performed within the user program 101. During this initialization, the user program 101 transfers the shared library user program 102 to the client library 103 and sends the shared library user program 102 to the server 110 through the communicating unit 105. The server 110 receives the shared library user program with the communicating unit 112 and stores the received shared library user program in the server library 111 as the shared library user program 114.

After the initialization, the user program 101 performs an instruction to call a function on the side of the server 110. This function is hereinafter referred to as a user function. Here, the user program 101 transfers a pointer to the user function that is to be called and the argument thereof to the client library 103.

In the client library 103, the user function symbol name acquiring unit 104 acquires a user function symbol name of an object pointed by the user function pointer. This acquisition process can be implemented using a "dladdr" function in the case of Linux, for example.

The client library 103 sends the symbol name and the given argument to the server 110 through the communicating unit 105. The server 110 receives these items of data through the communicating unit 112.

The server 110 transfers the symbol name of the user function to the user function pointer acquiring unit 113. The user function pointer acquiring unit 113 acquires a pointer to the user function to be called using the user function symbol name and the shared library user program 114 acquired during the initialization. In the case of Linux, for example, this acquisition process can be implemented by opening a shared library using a "dlopen" function to obtain a handle and calling a "dlsym" function using the obtained handle and a user function symbol name as an argument.

The user function executing unit 115 executes the user function using the user function pointer and the argument. The user function executing unit 115 sends a return value of the execution result to the client 100 via the communicating unit 112.

The client library 103 receives the return value of the execution result of the function via the communicating unit 105. The client library 103 returns the received return value to the user program 101. By doing so, it is possible to execute a designated function on the server 110 side according to an instruction from the client 100.

Next, an overall operation of this reference example will be described in detail with reference to FIGS. 1 and 2. First, the user program 101 designates the shared library user program 102 and executes initialization (step 201 of FIG. 2).

Due to this, the client library 103 sends the shared library user program 102 to the server 110 (step 211). The server library 111 receives the shared library user program (step 221) and registers the received shared library user program in the server library 111 (step 222).

Subsequently, the user program 101 transfers a user function pointer and an argument to the client library 103 in order to execute a user function at the server 110 (step 202). The client library 103 receives these (step 212) and acquires the user function symbol name using the user function pointer (step 213). The client library 103 sends the obtained user function symbol name and argument to the server 110 (step 214).

The server library 111 receives the user function symbol name and the argument (step 223) and acquires the user function pointer from the user function symbol name and the shared library user program 114 registered therein (step 224). The server library 111 executes the user function using the user function pointer and the argument (step 225) and sends the return value of the execution result to the client library 103 (step 226).

The client library 103 receives the return value (step 215) and returns the received return value to the user program 101 (step 203). By repeating steps 202 to 203, the user program 101 can execute the function multiple times on the server 110 side.

First Embodiment

Next, a first embodiment of the present invention will be described in detail with reference to FIGS. 3 and 4.

However, in the reference example described above, the number and type of arguments of the function executed on the server 110 side and the type of return value are not be able to be designated, and are therefore fixed. The reason for this is because the information on the number and the type of argument of a function is not be able to be obtained just by acquiring the function pointer with the user function pointer acquiring unit 113. The first embodiment solves this problem.

Figure 3:
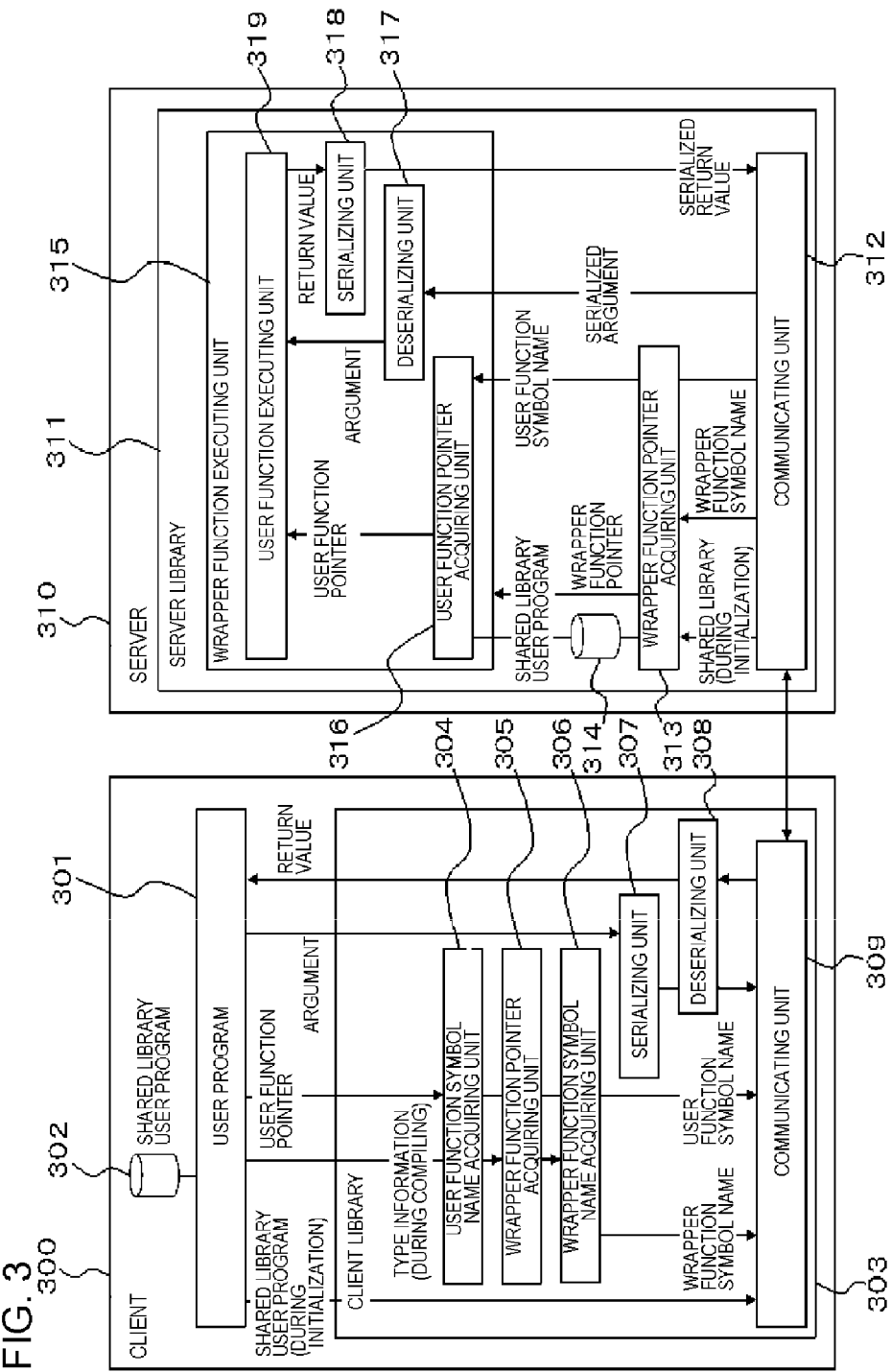
FIG. 3 is a block diagram illustrating a configuration example according to a first embodiment of the present invention.
Figure 4:
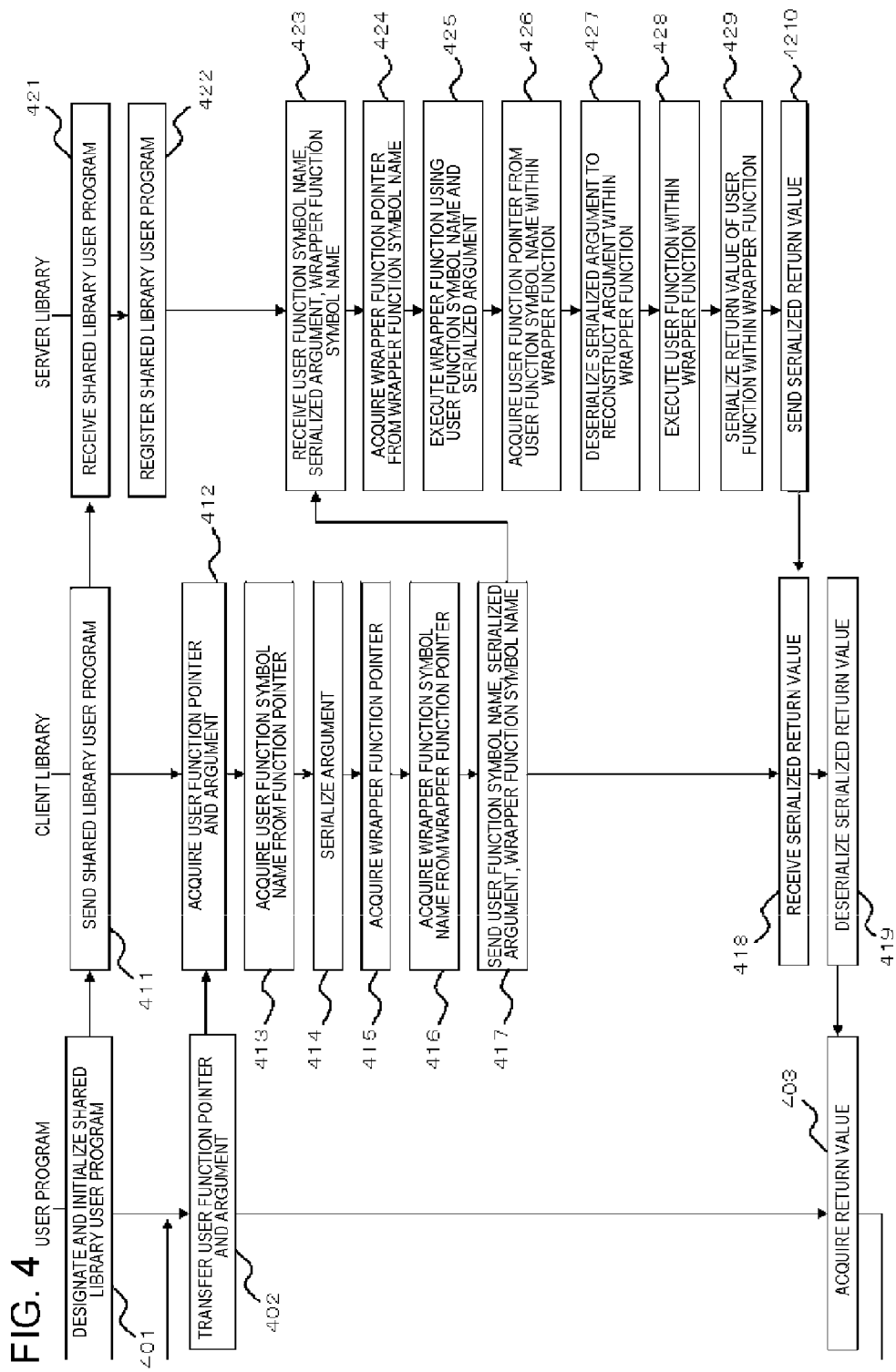
FIG. 4 is a flowchart illustrating an operation example according to the first embodiment of the present invention.

As illustrated in FIG. 3, a data processing system according to the first embodiment includes a client 300 and a server 310. The client 300 and the server 310 communicate with each other.

The client 300 includes a user program 301 and a client library 303. The user program 301 includes a shared library user program 302. The shared library user program 302 is obtained by compiling the user program 301 as a shared library.

The client library 303 includes a user function symbol name acquiring unit 304, a wrapper function pointer acquiring unit 305, a wrapper function symbol name acquiring unit 306, a serializing unit 307, a deserializing unit 308, a communicating unit 309, and the like.

The user function symbol name acquiring unit 304 acquires a user function symbol name of an object pointed by a pointer to a function. The wrapper function pointer acquiring unit 305 acquires a pointer to a wrapper function that is defined as a template function and internally executes the user function, by designating the types of argument and return value of the user function as the template argument. The wrapper function symbol name acquiring unit 306 acquires a wrapper function symbol name using the pointer to the wrapper function.

The server 310 includes a server library 311. The server library 311 includes a communicating unit 312, a wrapper function pointer acquiring unit 313, a wrapper function executing unit 315, and the like. The communicating unit 31 acquires, from the client 300, the user function symbol name, data corresponding to the argument of the user function, the wrapper function symbol name, and a shared library user program that is composed of the user program and the wrapper function compiled as a shared library, for example. The wrapper function pointer acquiring unit 313 acquires a pointer to the wrapper function using the wrapper function symbol name acquired by the communicating unit 31.

The wrapper function executing unit 315 includes a user function pointer acquiring unit 316, a user function executing unit 319, a deserializing unit 317, a serializing unit 318, and the like. The wrapper function executing unit 315 executes the wrapper function based on the user function symbol name and a serialized argument of the user function using these respective processing units.

The server library 311 stores the shared library user program 314 acquired from the client 300 in a form such that the shared library user program 314 can be accessed from the wrapper function pointer acquiring unit 313 and the user function pointer acquiring unit 316. The user function pointer acquiring unit 316 acquires a user function pointer to the user function to be called using the user function symbol name and the shared library user program 314 acquired during the initialization. The user function executing unit 319 executes the user function using the user function pointer and the argument.

Before describing the operation of the data processing system according to the first embodiment, a "wrapper function" different from that of the reference example described above will be described. By using this "wrapper function," it is possible to execute a user function having an optional type of argument and return value.

For implementation of a wrapper function, the present embodiment uses the program languages, such as C++, that can describe functions using generic programming functions (hereinafter, referred to as templates because such functions are called templates in C++) and in which functions with designated types are generated when compiled.

For example, if a template of C++ is used, a function can be described as below.
template <class T>
T add (T a, T b) {return a+b;}

When there is such a function definition, and the function is described as add <double> (1.0, 2.0), a function "add" of which the data type "T" is "double" can be used.

This is implemented when a compiler internally and automatically generates a function such as double add_double (double a, double b) {return a+b;}.

Using such a function, the first embodiment introduces a "wrapper function" that internally calls a user function as a template function. The types of argument and return value of the user function are defined as the template argument thereof.

The argument and return value of the wrapper function itself are assumed to be fixed without being dependent on these types. Thus, the wrapper function itself can be called on the server 310 side by the same method as the reference example described above. On the other hand, the wrapper function uses the types of argument and return value of a user function for executing the user function according to the types of the argument and the return value. As a result, it is possible to execute the user function having an optional type of argument and return value.

The wrapper function takes the symbol name of the user function and the serialized arguments of the user function as arguments of the wrapper function, and returns the serialized return value of the user function as the return value of the wrapper function. The return value of the wrapper function may be returned using a pointer acquired as an argument. In the following description, an example in which the return value of the wrapper function is returned as a return value will be used.

Here, serialization is an operation of converting a plurality of variables into one byte string or the like. An operation of reconstructing an original variable from a serialized byte string or the like is called deserialization. The wrapper function deserializes and reconstructs the arguments of the user function from serialized data using a type designated in the template argument.

Similarly, the wrapper function acquires, by using the type designated as the template argument, the function pointer of the user function according to the type thereof. Moreover, the wrapper function executes the user function using the function pointer and the argument. The return value of the execution result of the user function is serialized and is returned as the return value of the wrapper function.

Such a wrapper function is generated by a compiler in a portion of the wrapper function pointer acquiring unit 305 that acquires the pointer to the wrapper function according to the template argument. Thus, the wrapper function is also included in the shared library user programs 302 and 314.

The operation of the first embodiment will be described assuming that such a wrapper function is defined. First, similarly to the reference example described above, the user describes the user program 301, the user program 301 and the client library 303 are linked.

Here, a portion of the client library 303 is defined as the template function described above. For example, in the case of C++, the portion is defined in a header file and is also used during compiling.

Similarly to the reference example described above, when the user program 301 is compiled, the compiled user program 301 is also stored as a shared library. This is referred to as the shared library user program 302.

First, similarly to the reference example described above, initialization is performed within the user program 301. During this initialization, the user program 301 transfers the shared library user program 302 to the client library 303, and sends the shared library user program 302 to the server 310 via the communicating unit 309. The server 310 receives the shared library user program with the communicating unit 312, and stores the received shared library user program in the server library 311 as the shared library user program 314.

Next, the user program 301 transfers the user function pointer and the argument to the client library 303 similarly to the reference example. Here, the function of the client library 303 to be called is implemented as a template function and takes the types of argument and return value of the user function as a template argument.

In the client library 303, the user function symbol name acquiring unit 304 acquires the symbol name of an object in an object file, pointed by the user function pointer. In the client library 303, the serializing unit 307 performs serialization on the argument given from the user program 301.

Further, the wrapper function pointer acquiring unit 305 designates the types given to the client library 303 as the template argument, and acquires the wrapper function pointer. Moreover, the wrapper function symbol name acquiring unit 306 acquires the symbol name of the wrapper function using the wrapper function pointer.

The communicating unit 309 transfers the wrapper function symbol name, the user function symbol name, and the serialized argument to the server 310. The server 310 receives these via the communicating unit 312.

In the server 310, the wrapper function pointer acquiring unit 313 acquires the wrapper function pointer using the wrapper function symbol name and the shared library user program 314. In the server library 311, the wrapper function executing unit 315 executes the wrapper function specified by the acquired wrapper function pointer using the user function symbol name and the serialized argument of the user function as its argument.

As described above, the wrapper function acquires the user function pointer using the shared library user program 314 and the user function symbol name. Moreover, the wrapper function deserializes the serialized argument and acquires the argument of the user function. The wrapper function executes the user function specified by the user function pointer using the acquired argument of the user function, serializes the return value thereof, and returns the serialized return value as the return value of the wrapper function.

The serialized return value is returned to the client 300 via the communicating unit 312. In the client 300, the communicating unit 309 receives the return value, and the deserializing unit 308 deserializes the return value. Moreover, the deserialized return value is returned to the user program 301.

Next, an overall operation of the first embodiment will be described in detail with reference to FIGS. 3 and 4. First, the user program 301 designates the shared library user program 302, and executes initialization (step 401 of FIG. 4).

By doing so, the client library 303 sends the shared library user program 302 to the server 310 (step 411). The server library 311 receives this (step 421) and registers the received shared library user program in the server library 311 (step 422).

Next, the user program 301 transfers the user function pointer and the argument to the client library 303 in order to execute the user function at the server 310 (step 402). The client library 303 receives these (step 412) and acquires the user function symbol name using the user function pointer (step 413).

Next, the client library 303 serializes the acquired argument (step 414). Then, the client library 303 acquires the pointer to the wrapper function (step 415), and acquires the wrapper function symbol name using the wrapper function pointer (step 416). The client library 303 sends the user function symbol name, the serialized argument, and the wrapper function symbol name to the server 310 (step 417).

The server 310 receives the user function symbol name, the serialized argument, and the wrapper function symbol name (step 423). The server library 311 acquires the wrapper function pointer using the received wrapper function symbol name and the shared library user program 314 (step 424), and executes the wrapper function using the user function symbol name and the serialized argument (step 425).

Within the executed wrapper function, first, the user function pointer is acquired based on the user function symbol name and the shared library user program 314 (step 426). Then, the serialized argument is deserialized, and the argument is reconstructed (step 427).

The wrapper function executes the user function using these (step 428). The wrapper function serializes the return value of the user function (step 429). The serialized return value of the user function is returned as the return value of the wrapper function. The server library 311 sends the serialized return value of the user function to the client 300 (step 4210).

The client library 303 receives the serialized return value (step 418), and deserializes this (step 419). Then, the client library 303 returns the deserialized return value to the user program 301 (step 403).

Next, the operations and effects of the first embodiment described above will be described. In the first embodiment described above, a wrapper function that internally calls a user function having an optional type of argument and return value is defined as a template function, the types of argument and return value of the wrapper function itself are fixed, and the wrapper function is called on the server 310 side. Due to this, according to the first embodiment, it is possible to call the user function having various types of argument and return value on the server 310 side.

In the data processing system of the first embodiment described above, an RPC is implemented in such a manner that the user program 302 that is stored as a shared library on the client 300 side and the symbol name of a called function are sent from the client 300 to the server 310, the function pointer to be called is acquired on the server 310 side using the symbol name and the shared library user program 302, and the user function is executed. Due to this, according to the first embodiment, a language that is compiled as native codes such as C or C++ is employed, and it is possible to describe the RPC without using an IDL.

Further, according to the first embodiment, it is possible to implement the RPC without separately describing a program performed on the server 310 side and a program performed on the client 300 side. The reason for this is because the server 310 receives the shared library user program 302 (314) using the server library 311 that is not dependent on the user program, and therefore a function defined within the user program is executed on the server 310 side. Further, according to the first embodiment, since it is not assumed that operations are performed in the OS level, it can be implemented as a library that operates on the existing OS without the need for changing the OS, and usability thereof is high.

Second Embodiment

Figure 5:
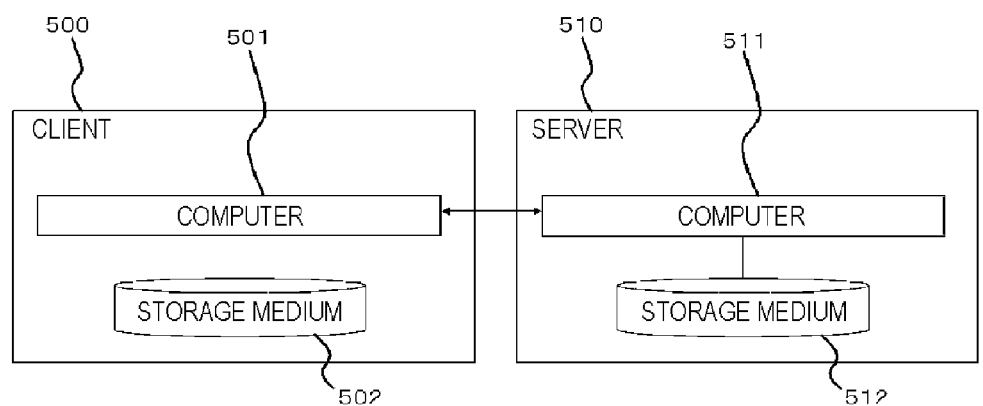
FIG. 5 is a block diagram illustrating a configuration example according to a second embodiment of the present invention.

Next, a second embodiment will be described in detail with reference to FIG. 5. A data processing system according to the second embodiment has a hardware configuration as illustrated in FIG. 5. A client 500 includes at least one computer 501, a storage medium 502, and the like. A server 510 includes at least one computer 511, a storage medium 512, and the like.

The computers 501 and 511 include central processing units (CPUs), memories, input/output interface (I/F), and the like, and they are connected to each other. The storage media 502 and 512 are media such as a hard disk, CD, DVD, Blu-ray disc (trademark), or the like, for example. The storage media 502 and 512 store the user program 301, the shared library user program 302, the client library 303, the server library 311, and the like, which are described above in the first embodiment. The computers 501 and 511 read these programs stored in the storage media 502 and 512, execute the read programs with CPUs, and thereby realizing the data processing system according to the first embodiment described above.

In the second embodiment, the user function symbol name acquiring unit 304, the wrapper function pointer acquiring unit 305, the wrapper function symbol name acquiring unit 306, the serializing unit 307, the deserializing unit 308, and the communicating unit 309, which are included in the client library 303 of the first embodiment, are implemented as software elements. These software elements are realized when modules included in the client library 303 or modules provided by the OS (not illustrated) of the computer 501 are executed by the CPU, for example.

Moreover, in the second embodiment, the wrapper function executing unit 315, the wrapper function pointer acquiring unit 313, the communicating unit 312, the user function executing unit 319, the serializing unit 318, the deserializing unit 317, and the user function pointer acquiring unit 316, which are included in the server library 311 of the first embodiment, are also implemented as software elements. These software elements are realized when modules included in the server library 311 or modules provided by the OS (not illustrated) of the computer 511 are executed by the CPU, for example.

Moreover, although it is not specified in the first embodiment described above, compilers (including linkers or the like) which are software that converts the user program 301, the client library 303, the server library 311, and the like into execution formats (native codes) are also stored in the computer 501 or 511. When the respective processing units of the first embodiment are implemented, these compilers are executed by the computer 501 or 511.

Therefore, in the second embodiment, operation entities in the description of the operation of the first embodiment (the user program 301, the client library 303, the server library 311, the wrapper function, and the like) can be substituted with the CPU. The same is true for the following examples.

Examples

Next, the operation of specific examples of the present invention will be described with reference to FIGS. 6 to 14. In this section, source codes that are described in the C or C++ language and executed on the Linux OS are illustrated as examples. However, since the source code illustrated in the respective figures is a part of a whole source code, the described source code does not operate as it is.

A first example is illustrated in FIGS. 6 to 8. FIG. 6 illustrates a user program, FIG. 7 illustrates a client library, and FIG. 8 illustrates a server library.

In the user program of FIG. 6, functions (user functions) "userfunc1" and "userfunc2" are defined. These functions are functions that are to be executed by a server. In the reference example, the number and type of arguments of these functions, and the type of the return value are fixed. Each function of the reference example is defined as a function that takes one "int" type argument and returns an "int" type return value.

Within the main( ), first, the information on a server including an IP address and the like is acquired to "server" which is a Node-type variable. It is assumed that the Node type is defined in a library.

Next, a function "init" is called, whereby initialization is performed. A variable "server" and a file name of a shared library user program are transferred to the function "init" as the arguments thereof. That is, the functions "userfunc1" and "userfunc2" are present as shared libraries in a file indicated by this file name.

With a description "rpc(server, userfunc1, 1)" on the next line, a function "userfunc1(1)" is called on the server side, and the return value thereof is obtained as a return value of an "rpc" function. In the case of this example, "2" is returned as a return value. The function "userfunc2" is executed in the same manner.

Next, the client library 303 will be described with reference to FIG. 7. In the client library 303, a function "init" and a function "rpc" are defined as functions that are called from a user program.

When the "init" function is executed, a shared library user program is sent to the server. Thus, within the "init" function, first, a "connect_to_server" function is executed, whereby a connection to the server is realized. In this example, this function receives a Node-type variable, connects to a server indicated by this Node-type variable, and then returns a file descriptor that indicates a socket.

Next, a shared library user program designated by the file name is read according to a "read_from_file" function. This function reads the content of the file from the file, and writes the read content in a memory area indicated by a "char" type pointer given as a first argument. In this example, a statement of a variable, allocation and release of memory are omitted. Then, the number of the read byte is returned.

Next, a "write_to_socket" function sends the content of the file to the server. This function sends data to the server by designating a socket, a "char" type pointer in which data to be sent is included, and a size thereof. Finally, a "close_connection" function is called. This function closes a socket created by a "connect_to_server" function.

Next, an "rpc" function will be described. Since a "get_symbol" function is used within the "rpc" function, first, this will be described. The "get_symbol" function receives a function pointer, and calls a "dladdr" function provided by the OS to thereby acquire the symbol name of the function pointer. The function pointer and a pointer to a "Dl_info" type variable defined by the OS are transferred to the "dladdr" function, whereby the symbol name of the function is returned to a "dl_sname" member of the "Dl_info" type variable.

Next, the operation of the "rpc" function will be described. The "rpc" function acquires the symbol name of the function pointer given as an argument using the above-described "get_symbol" function. Then, similarly to the above, the "rpc" function connects to the server using the "connect_to_server" function, and acquires a file descriptor of a socket.

Moreover, first, the "rpc" function sends the user function symbol name to the server, using a "write_to_socket" function. To do so, the file descriptor of the socket, and the user function symbol name and the size thereof are given as the arguments.

Next, the "rpc" function sends the argument to the server. Therefore, the file descriptor, one obtained by casting the arguments to a "char" type pointer, and a size of (int) (in this example, an "int" type) are given as the arguments of the "write_to_socket" function.

Next, the "rpc" function receives the execution result from the server, using a "read_from_socket" function. This function takes the file descriptor of the socket and the "char" type pointer, and receives the data of the execution result from the server. Then, the "rpc" function casts a value received from the server (the value of a variable "buf") to an "int" type, and sets the value to a variable "ret." Finally, the "rpc" function closes the socket with a "close_connection" function and returns the value of the variable "ret" as a return value of the "rpc" function.

Next, the operation of the server library will be described with reference to FIG. 8.

First, in the server library, an "accept_connection" function accepts a connection from the client. In the example of FIG. 8, this function establishes a connection in response to execution of the "connect_to_server" function by the client. This function returns the file descriptor of a socket as a return value. A process may be forked for each connection, and a separate process may be generated for each connection. In this case, a parent process returns to execution of the "accept_connection" function, and a child process performs the following processes.

The server receives a shared library user program from the client with a "read_from_socket" function using this connection. The "read_from_socket" function returns the number of the read byte as a return value.

Next, a "write_to_file" function is called in order to write the shared library user program read on the memory to a file. This function designates a file name, and a pointer to a memory area in which the shared library user program is read and a size thereof, and writes the shared library user program to a file indicated by the file name of the argument. In this example, "/tmp/tmpfile.so" is designated as the file name of a write destination.

Moreover, the shared library is opened by a "dlopen" function, which is a function provided by the OS. The file name of the written file and a flag (in this example, RTLD_LAZY) that determines the operation of "dlopen" are designated in the arguments. The return value of the "dlopen" function is "handle" which is used later.

Moreover, a "close_connection" function is called, and the connection with the client is closed. After that, the server executes a loop for receiving a request to execute a user function from the client.

First, the server accepts a connection from the client with the "accept_connection" function. In order to receive another request of execution of a user function in parallel even during execution of a certain user function, the following processes for executing a user function may be performed in a separate thread.

In this case, a parent thread returns to execution of the "accept_connection" function, and the generated thread performs the following processes. By using a thread rather than a process, when a user function sets a value to a global variable, for example, the value can be used from a user function call that is called later.

Next, a user function symbol name is received with a "read_from_socket" function. Further, the argument is received with a subsequent "read_from_socket" function. The argument is casted to an int-type. A subsequent "typedef" defines the type of a called function as "functype." In this example, the "functype" is defined as a pointer to a function that takes an "int" type value as its argument and returns an "int" type value.

Then, the server acquires a pointer to a function that is to be called by calling a "dlsym" function provided by the OS. The argument of the "dlsym" function includes a handle that is obtained by executing a "dlopen" function and the symbol name of the function. Since the pointer to a function is obtained as a return value of the "dlsym" function, the pointer is casted to a "functype" type variable and is assigned.

Then, the server gives the argument to the pointer to the function, and executes the function. The return value of this function is sent to the client with the "write_to_socket" function. Finally, the server closes the connection with the "close_socket" function and returns to the beginning of the loop.

Next, a second example will be described with reference to FIGS. 9 to 14. FIG. 9 illustrates a user program, FIGS. 10 to 13 illustrate a client library, and FIG. 14 illustrates a server library.

First, the user program of FIG. 9 will be described. Although this is substantially the same as that of the first embodiment, in this example, the type of a function called on the server and the number of arguments of the function can be changed. That is, a "userfunc1" function is a function that takes one "int" type argument and returns an "int" type value, whereas a "userfunc2" function is a function that takes two "double" type arguments and returns a "double" type value.

Moreover, as will be described later, in the second example, although a "rpc" function is implemented as a template function, it is not necessary to designate a data type like "rpc<int, int>" when calling, since a compiler can infer the data type.

Next, the client library will be described with reference to FIGS. 10 to 13. FIGS. 10 and 11 illustrate a definition when the number of arguments of a user function is one, and FIGS. 12 and 13 illustrate a definition when the number of arguments of a user function is two.

As described above, in the second example, a plurality of function definitions, corresponding to the number of arguments of a user function, are prepared. Although this example illustrates a case where the number of arguments is up to two, a larger number of arguments may be accepted simply by adding a definition having a larger number of arguments.

FIGS. 10 and 12 illustrate a definition of "wrapper", which is a wrapper function. FIGS. 11 and 13 illustrate a definition of an "rpc" function.

First, the "wrapper" function of FIG. 10 will be described. The "wrapper" function is defined as a template function. Since the example of FIG. 10 illustrates a definition in which a function takes one argument, a data type "R" of a return value of the user function and a data type "T1" of the argument are designated as a template argument.

The argument of the "wrapper" function includes "symbol" in which the symbol name of the user function is set, "handle" in which the handle obtained with the "dlopen" function is set, "input" which is a serialized argument, and "output" which is a serialized return value. Since the serialized return value is created within the "wrapper" function and returned to a caller, the "output" is a pointer argument.

An example described in the second example (based on the library version 1.35) is the example of implementing a serialization function using a serialization library that is provided by a library group called a Boost.

The type of the variable "input" is "binary_iarchive," the type of the variable "output" is "binary_oarchive," and these types are the data types that the serialization library of the Boost provides. The "binary_iarchive" type variable is used in order to deserialize serialized data, and the "binary_oarchive" type variable is used in order to serialize variables.

Within the "wrapper" function, first, the type of a user function is defined as "functype" using "typedef." In the example of FIG. 10, "functype" is defined as a type such that it takes a "T1" type argument and uses an "R" type as its return value. Then, a "dlsym" function is called using "symbol" in which the symbol name of the user function is set and "handle" in which the handle obtained with the "dlopen" function as its argument, whereby the user function pointer is acquired. This is casted to a "functype" type and assigned to a variable "f."

Further, a variable "a1" having a "T1" type which is a data type of the argument and a variable "ret" having an "R" type which is a data type of the return value are defined. Then, data obtained by deserializing the variable "input", which is the argument, is assigned to the variable "a1." In the serialization library of the Boost, this deserialization operation is defined as ">>."

Next, the user function "f" is executed using the variable "a1" as the argument, and the return value is stored in the variable "ret." Data obtained by serializing the variable "ret" is input to the variable "output", which becomes the return value. In the serialization library of the Boost, this serialization operation is defined as "<<."

Next, the "rpc" function will be described with reference to FIG. 11. The "rpc" function is also defined as a template function. Since the example of FIG. 11 illustrates a definition in which the user function takes one argument, the data type "R" of the return value of the user function and the data type "T1" of the argument are designated as the template argument.

Although the argument of the "rpc" function is the same as that of the first example, there is no limitation in a data type of the argument since the "rpc" function is defined as the template function. Within the "rpc" function, first, a wrapper function pointer is acquired. In this case, the data type given as the template argument is designated as "wrapper<R, T1>," the wrapper function pointer corresponding to the data type is acquired. A compiler creates a definition of the "wrapper" function corresponding to the template argument "R, T1" at the point in time that the wrapper function pointer is acquired.

Next, the symbol name of the wrapper function obtained above is acquired. In this operation, the "get_symbol" function used in the first example is used. Next, the "get_symbol" function is called using, as an argument, the user function pointer given as the argument of the "rpc" function, whereby the user function symbol name is acquired.

Then, the argument "a1" is serialized. In the serialization library of the Boost, when a serialized result is received as a "string" type, a "binary_oarchive" type variable is defined using, as an argument, an "ostringstream" type variable of a standard library.

In this example, a variable "OS" having an "ostringstream" type is defined, and that is used to define a variable "input" having a "binary_oarchive" type. Then, as described above, the argument "a1" is serialized using "<<."

Next, the "rpc" function connects to the server using the "connect_to_server" function. The file descriptor of a socket obtained with the "connect_to_server" function is given as an argument to a "write_to_socket" function, whereby the user function symbol name is sent.

Next, the serialized argument is sent. Since the serialized result is set to the "ostringstream" type variable "os," the serialized result is taken first as a "string" type with a "str( )" member function, and is further taken as a "char" type pointer with a "c_str( )" member variable.

The size of the serialized result can be obtained by taking that as a "string" type and calling a "length( )" member function. Then, the wrapper function symbol name is sent. After that, the serialized return value is acquired with a "read_from_socket" function.

In order to deserialize the acquired data, a variable "is" having an "istringstream" type of the standard library is defined using, as an argument, one obtained by converting the data into a "string" type. Then, a variable "output" having a "binary_iarchive" type is defined using the variable "is" as an argument.

A variable "ret" that stores the return value is defined, and similarly to the above, the data obtained by deserializing the variable "output" using ">>" is set to the variable "ret." Finally, the connection to the server is closed with the "close_connection" function, and the return value "ret" is returned to the user program.

FIGS. 12 and 13 illustrate a definition in which the user function takes two arguments. Hereinafter, the "wrapper" function of FIG. 12 will be described, mainly in terms of a difference from the definition in which the user function takes one argument, illustrated in FIG. 10. In this case, the number of template arguments is three in total which includes one return value and two arguments.

Moreover, in the type of the user function, the number of arguments is different. Therefore, deserialization of the argument is performed for two arguments, and the user function is called using two arguments. The name of the function is "wrapper." Although it is the same as the case illustrated in FIG. 10 where the number of arguments is one, this is permitted in C++.

Next, the "rpc" function of FIG. 13 will be described, mainly in terms of a difference from the definition in which the user function takes one argument, illustrated in FIG. 11. Similarly to the case of the "wrapper" function, the number of template arguments is three in total which includes one return value and two arguments.

Moreover, in terms of the arguments of the "rpc" function itself, the type of the user function pointer is changed and an argument of the user function is added since the number of arguments of the user function is two. In the portion at which the "wrapper" function pointer is acquired, the number of template arguments is three. Then, in the portion at which the arguments are serialized, two arguments are serialized.

As described above, it is possible to describe a definition of the user function having three or more arguments by applying changes such as a change from FIG. 10 to FIG. 12 and a change from FIG. 11 to FIG. 13.

Next, the server library will be described with reference to FIG. 14. The same server library is used regardless of the number of arguments. The initialization portion is the same as that of the first example.

Within a while sentence, first, a connection from the client is accepted with "accept_connection" function. The symbol of the user function and the serialized argument are acquired from the client using the file descriptor of the socket obtained here. Then, in order to create a "binary_iarchive" type variable, an "istringstream" type variable "is" is defined using, as an argument, data obtained by converting the acquired argument "buf" into a "string" type. Further, a "binary_iarchive" type variable "input" is defined using the variable "is" as an argument. This variable "input" is used later as an argument of the "wrapper" function.

Next, the wrapper function symbol name is acquired from the client. Based on this, a wrapper function pointer is acquired using a "dlsym" function. Then, an "ostringstream" type variable "os" is defined, and a "binary_oarchive" type variable "output" is defined using the variable "os" as an argument. This variable "output" is used as an argument of the "wrapper" function in order to receive the content that the return value is serialized.

Then, the "wrapper" function is executed using a pointer to the "wrapper" function acquired above. In this case, the user function symbol name ("symbol"), a handle ("handle") obtained with the "dlopen" function, the "binary_iarchive" type variable "input" that internally includes the serialized argument, and a pointer to the "binary_oarchive" type variable "output" that is for storing one that is serialized the return value of the user function are given as the arguments of the "wrapper" function.

When the wrapper function is executed, according to the definition of the "wrapper" function described above, the arguments are deserialized, the user function pointer is acquired using the user function symbol name, the user function is executed using the deserialized arguments, and the return value is serialized and assigned to the variable "output."

As a result, after the "wrapper" function is finished, the content of the serialized return value is sent to the client. In this case, "string" type data is taken from the "ostringstream" type variable "os" with a "str( )" member function, and a data of a "char" type pointer is further taken with a "c_str( )" member function The size of the taken data is obtained by calling a "length( )" member function with respect to the "string" type data taken with the member function "str( )" of the variable "os." By calling a "write_to_socket" function using these as an argument, whereby the content of the serialized return value is sent to the client.

The present invention is not limited to the present embodiments, and various modifications can be made without departing from the spirit thereof. For example, the present invention can be applied to applications that describe programs that are executed in parallel on a plurality of servers connected via a network. Moreover, the present invention can also be applied to applications that describe programs that use resources (files or the like) on a separate server connected via a network.

Obviously, the above-described embodiments and the plurality of examples can be combined within a range where the content does not conflict each other. Moreover, although the programs and the like of the respective units have been described in detail in the embodiments and examples described above, the programs and the like can be changed in various ways without departing from the scope of the present invention.

This application is based upon and claims the benefit of priority from Japanese patent application No. 2010-138398, filed on Jun. 17, 2010, and the disclosure of which is incorporated herein in its entirety by reference.

The invention claimed is:

1. A data processing system comprising:
   a client apparatus; and
   a server apparatus,
   wherein the client apparatus and the server apparatus communicate with each other,
   wherein the client apparatus comprises at least one processor, the at least one processor being configured to implement:
   a user function symbol name acquiring unit that acquires a user function symbol name of an object pointed to by a pointer to a user function of a user program, the user function being compiled in a shared library and included in a shared library user program;
   a wrapper function generating unit that generates a wrapper function of the user function from a predetermined template function based on a type and number of one or more arguments of the user function and a return value of the user function, the wrapper function being compiled in the shared library and included in the shared library user program;

a first wrapper function pointer acquiring unit that acquires a pointer to the wrapper function within the shared library user program in the client apparatus;

a wrapper function symbol name acquiring unit that acquires a wrapper function symbol name of the wrapper function based on the pointer to the wrapper function within the shared library user program in the client apparatus; and a first communicating unit that provides the server apparatus with the user function symbol name, data corresponding to the one or more arguments of the user function, the wrapper function symbol name, and the shared library user program, and wherein the server apparatus comprises at least one processor, the at least one processor being configured to implement:

a second communicating unit that acquires the user function symbol name, data corresponding to the one or more arguments of the user function, the wrapper function symbol name, and the shared library user program, which are provided by the client apparatus;

a second wrapper function pointer acquiring unit that acquires a pointer to the wrapper function within the shared library user program in the server apparatus based on the wrapper function symbol name acquired by the second communicating unit;

a user function pointer acquiring unit that acquires a pointer to the user function within the shared library user program in the server apparatus based on the user function symbol name acquired by the second communicating unit; and a wrapper function executing unit that executes the wrapper function specified by the pointer to the wrapper function within the shared library user program in the server apparatus, wherein the user function symbol name and the data corresponding to the one or more arguments of the user function are provided to the wrapper function as arguments, the wrapper function acquires a pointer to the user function within the shared library user program in the server apparatus based on the user function symbol name and executes the user function specified by the pointer to the user function within the shared library user program in the server apparatus, and the data corresponding to the one or more arguments of the user function being provided to the user function as arguments.

2. The data processing system according to claim 1, wherein the second communicating unit acquires serialized argument data from the client as the data corresponding to the one or more arguments of the user function, wherein the user function pointer acquiring unit acquires a user function pointer to a user function within the shared library user program in the server apparatus that is to be called, based on the shared library user program and the user function symbol name, both of which are acquired by the second communicating unit, and wherein the at least one processor of the server apparatus is further configured to implement: a user function executing unit that reconstructs the one or more arguments of the user function from the serialized argument data acquired by the second communicating unit, and executes the user function using the user function pointer and the reconstructed one or more arguments.

3. A computer apparatus comprising at least one processor, the at least one processor being configured to implement:

a user function symbol name acquiring unit that acquires a user function symbol name of an object pointed to by a pointer to a user function of a user program, the user program being compiled in a shared library and included in a shared library user program;

a wrapper function generating unit that generates a wrapper function of the user function from a pre-determined template function based on a type and number of one or more arguments of the user function and a return value of the user function, the wrapper function being compiled in the shared library and included in the shared library user program;

a wrapper function pointer acquiring unit that acquires a pointer to the wrapper function within the shared library user program in the computer apparatus;

a wrapper function symbol name acquiring unit that acquires a wrapper function symbol name of the wrapper function based on the pointer to the wrapper function within the shared library user program in the computer apparatus; and a communicating unit that provides another computing apparatus with the user function symbol name, data corresponding to the one or more arguments of the user function, the wrapper function symbol name, and the shared library user program.

4. A computer apparatus device comprising at least one processor, the at least one processor being configured to implement:

a communicating unit that acquires a shared library user program including a user function of a user program and a wrapper function, wherein a user function symbol name, data corresponding to one or more arguments of the user function, and a wrapper function symbol name are provided by another computer apparatus, the user function having been compiled in a shared library and included in the shared library user program by the another computer apparatus, the wrapper function having been generated from one template function from among a plurality of template functions, the one template function having been determined based on a type and number of one or more arguments of the user function and a return value of the user function, and the wrapper function having been compiled in the shared library by the another apparatus;

a wrapper function pointer acquiring unit that acquires a pointer to the wrapper function within the shared library user program in the computer apparatus based on the wrapper function symbol name acquired by the communicating unit; and a wrapper function executing unit that executes the wrapper function specified by the pointer to the wrapper function within the shared library user program in the computer apparatus, wherein the user function symbol name and the data corresponding to the one or more arguments of the user function are provided to the wrapper function as arguments, the wrapper function acquires a pointer to the user function within the shared library user program in the computer apparatus based on the user function symbol name and executes the user function specified by the pointer to the user function within the shared library user program in the computer apparatus, and the data corresponding to the one or more arguments of the user function is provided to the user function as arguments.

5. The computer device according to claim 4,
wherein the communicating unit acquires serialized argument data from the another computer device as the data corresponding to the one or more arguments of the user function,
wherein the wrapper function executing unit includes a user function pointer acquiring unit and a user function executing unit that are activated with the execution of the wrapper function, and
wherein the wrapper function executing unit reconstructs the one or more arguments of the user function from the serialized argument data acquired by the communicating unit, and executes the user function using the user function pointer and the reconstructed one or more arguments.

6. A non-transitory computer-readable storage medium with an executable program executed by a client and a server that communicate with each other,
wherein the program causes the following to be implemented in the client:
a user function symbol name acquiring unit that acquires a user function symbol name of an object pointed to by a pointer to a user function of a user program, the user program being compiled in a shared library and included in a shared library user program;
a wrapper function generating unit that generates a wrapper function of the user function from a pre-determined template function based on a type and number of one or more arguments of the user function and a return value of the user function, the wrapper function being compiled in the shared library and included in the shared library user program;
a first wrapper function pointer acquiring unit that acquires a pointer to the wrapper function within the shared library user program in the client;
a wrapper function symbol name acquiring unit that acquires a wrapper function symbol name of the wrapper function using the pointer to the wrapper function within the shared library user program in the client; and
a first communicating unit that provides the server with the user function symbol name, data corresponding to the one or more arguments of the user function, the wrapper function symbol name, and the shared library user program, and
wherein the program causes the following to be implemented in the server:
a second communicating unit that acquires the user function symbol name, data corresponding to the one or more arguments of the user function, the wrapper function symbol name, and the shared library user program, which are provided by the client;
a second wrapper function pointer acquiring unit that acquires a pointer to the wrapper function within the shared library user program in the server based on the wrapper function symbol name acquired by the second communicating unit;
a user function pointer acquiring unit that acquires a pointer to the user function within the shared library user program in the server based on the user function symbol name acquired by the second communicating unit; and
a wrapper function executing unit that executes the wrapper function specified by the pointer to the wrapper function within the shared library user program in the server,
wherein the user function symbol name and the data corresponding to the one or more arguments of the user function being provided to the wrapper function as arguments, the wrapper function acquires a pointer to the user function within the shared library user program in the server based on the user function symbol name and executes the user function specified by the pointer to the user function within the shared library user program in the server, and the data corresponding to the one or more arguments of the user function is provided to the user function as arguments.

7. The non-transitory computer-readable storage medium with an executable program according to claim 6, wherein the second communicating unit acquires serialized argument data from the client as the data corresponding to the one or more arguments of the user function,
wherein the user function pointer acquiring unit acquires a user function pointer to a user function within the shared library user program in the server that is to be called, based on the shared library user program and the user function symbol name, both of which are acquired by the second communicating unit, and
wherein the second user function executing unit reconstructs the one or more arguments of the user function from the serialized argument data acquired by the second communicating unit, and executes the user function using the acquired user function pointer and the reconstructed one or more arguments.

8. A data processing method executed by a client and a server that communicate with each other, the data processing method comprising:
acquiring, by the client, a user function symbol name of an object pointed to by a pointer to a user function of a user program, the user function being compiled in a shared library and included in a shared library user program;
generating, by the client, a wrapper function of the user function from a pre-determined template function based on a type and number of one or more arguments of the user function and a return value of the user function, the wrapper function being compiled in the shared library and included in the shared library user program;
acquiring, by the client, a pointer to the wrapper function within the shared library user program in the client;
acquiring, by the client, a wrapper function symbol name of the wrapper function using the pointer to the wrapper function within the shared library user program in the client;
acquiring, by the server, the user function symbol name, data corresponding to the one or more arguments of the user function, the wrapper function symbol name, and the shared library user program, which are provided by the client;
acquiring, by the server, a pointer to the wrapper function within the shared library user program in the server based on the acquired wrapper function symbol name;
acquiring, by the server, a pointer to the user function within the shared library user program in the server based on the acquired user function symbol name; and
executing, by the server, the acquired wrapper function specified by the pointer to the wrapper function within the shared library user program in the server, the acquired user function symbol name and the acquired data corresponding to the one or more arguments of the user function being provided to the wrapper function as arguments, the wrapper function acquiring a pointer to the user function within the shared library user program in the server based on the acquired user function symbol name and executing the user function specified by the pointer to the user function within the shared library user program in the server, the acquired data corresponding to the one or more arguments of the user function being provided to the user function as arguments.

9. The data processing method according to claim 8, wherein the data corresponding to the one or more arguments of the user function is serialized argument data, and
  wherein the executing the wrapper function comprises:
    acquiring, by the server, a user function pointer to the user function within the shared library user program in the server that is to be called, based on the acquired shared library user program and the acquired user function symbol name;
    reconstructing, by the server, the one or more arguments of the user function from the serialized argument data; and
    executing, by the server, the user function using the acquired user function pointer and the reconstructed one or more arguments.

* * * * *